June 28, 1932. W. E. GOLDSBOROUGH 1,865,056

FLAMBEAU TYPE OF BURNER

Filed July 19, 1928

Inventor
WINDER E. GOLDSBOROUGH
By his Attorney
Edmund G. Borden

Patented June 28, 1932

1,865,056

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

FLAMBEAU TYPE OF BURNER

Application filed July 19, 1928. Serial No. 293,867.

The present invention relates to the art of fuel burners.

It has been proposed to burn fluid fuels by passing them through refractory walls or beds and burning the fuel at the outer surface of the refractory. In particular, it has been proposed to form refractory particles into bonded porous diaphragms, to pass the fuel through the porous diaphragm and to burn it at the outer surface of the diaphragm. In burning liquid fuels or oils from the surface of a refractory bed or porous diaphragm, some difficulty has been encountered due to the tendency of the liquid to carbonize and to form a deposit tending to clog the passage through the refractory body. This tendency to carbonize and clog the passage through the refractory has been less marked when gaseous fuels have been used with the refractory bed or porous diaphragm. It is accordingly one of the objects of the present invention to minimize the difficulty of burning oils with burners employing porous refractory beds or diaphragms by vaporizing the oil before passing it through the refractory body.

It has been proposed to burn both liquid and gaseous fuels in certain burner installations, more particularly in installations intended for domestic or household heating, the object of using such combined installations being in large measure to combine the convenience, cleanliness and efficiency of heating by gas with means adapted to carry the emergency or peak loads of the heater. In this way, the domestic installations do not contribute materially to the peak load on the gas works and gas mains and the consumer is thereby able to obtain better rates for the gas employed in house heating.

It is another object of the present invention to so combine the gas jets of a combined gas and oil heater with the porous refractory of the oil burner that the gas flame enhances the average efficiency of the oil burner by burning off from the porous refractory of the oil burner any carbon deposits which may have begun to form thereon.

Oil burners employing porous refractory beds or diaphragms have in the past encountered difficulty, not only from the fact that the oil has tended to carbonize within the refractory, but also due to the fact that the average grade of oil employed for household and like heating contains more or less foreign matter which has a tendency to clog the passages in the refractory body. Such refractory bed burners therefore have usually either had to employ a better and more expensive grade of oil than the average or to install filtering means which have in themselves been a source of difficulty.

It is a further object of the present invention to provide a convenient and efficient settling chamber through which the oil passes on its way to a refractory bed burner.

It has been proposed to employ a drip pan in connection with liquid fuel burners, the pan being so arranged as to catch unburned oil which might flow from the burner and being connected by pipe to the oil reservoir. In many installations of this kind, however, there is danger that the oil in the drip pan may become ignited and the flame be conducted through the return pipe to the fuel tank.

It is another object of the present invention to provide means whereby a drip pan for oil fuel may be used in connection with a burner without danger of the flame passing from the drip pan or receptacle into the return pipe.

A further object of the present invention is to provide a drip pan or receptacle so arranged that liquid fuel may be burned at its mouth to vaporize the fuel passing to the burner when putting the burner into operation.

Further objects and advantages of the present invention will be apparent to those skilled in the art from the following description taken in connection with the accompanying drawing, in which.

Figure 1:
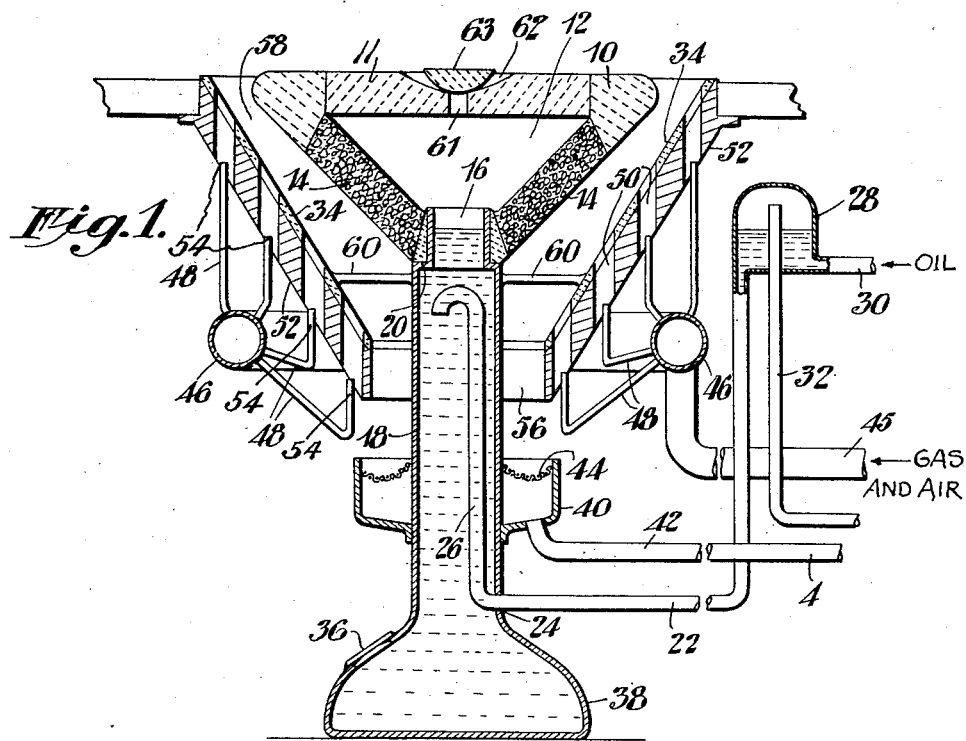
Fig. 1 is a central vertical section through a combined oil and gas burner according to the present invention.

Referring to the drawing, 10 is a hollow body of refractory approximately of the form of an inverted cone and having an interior chamber 12. The flat top of the cone-like body 10 is formed of an impermeable refractory disk 11. The body 10 forms part of an oil burner according to the present invention, it being intended that the fuel in the chamber 12 shall preferably be in the form of vapor. The sides of the body 10 flare outwardly and upwardly. In order to permit the escape of vapor from chamber 12, the sides are made porous in the zone 14 to permit the escape of the vapors through the refractory. Fuel is supplied to the chamber 12 through the throat 16 at the upper end of a standpipe or settling chamber 18. In the arrangement illustrated, the burner head or body 10 is supported at the upper end of the standpoint 18 by a shoulder 20. Liquid fuel is supplied to the standpipe 18 through the supply pipe 22 which enters the wall of the chamber 18 at the point 24. As illustrated, the pipe 22 is extended upwardly within the chamber 18 as appears at 26, the length 26 extending nearly to the throat 16. However, the extension 26 of the supply pipe may be omitted if desired. Oil enters the pipe 22 from an overflow chamber 28 which is supplied by a pipe 30. An overflow pipe 32 extends upwardly into the chamber 28 and runs from thence to a cutoff mechanism (not shown) in the supply pipe 30. The upper end of the overflow pipe 32 is extended only slightly above the upper end of the throat 16 so that if the oil is supplied to the burner faster than it is consumed or if the flame becomes extinguished for any reason the oil overflows into pipe 32 and operates the cutoff mechanism to stop the flow of oil. Cutoff mechanisms for the purpose just mentioned are in use and form no part of the present invention and therefore the cutoff mechanism is not illustrated or described herein.

It is preferred that the oil be vaporized before passing through the wall 14. This is for the reason that there is less tendency to clog the passages through the refractory body when the fuel is used in the form of vapor. In the arrangement illustrated, the means for vaporizing the oil comprises a reflecting surface 34 which surrounds the body 10 and flares upwardly and outwardly roughly parallel to, but approaching as it rises the wall 14 containing a porous zone. The upper end of the surface 34 is preferably about at the level of the top of the body 10 and the lower end of surface 34 preferably extends downwardly below the level of the top of standpipe 18, whereby the reflection of radiation from the burners 54 and 14 to the standpipe is facilitated. The lower part of the surface 34 may also be connected with the upper part of the standpipe 18 by the ribs 60, which then serve both to stiffen the structure and to conduct heat to the standpipe 18. The under or lower side of these ribs may be coated with a heat insulating compound to offset the cooling effects of the rising streams of the air of combustion. When fuel is being burned at the surface of zone 14, therefore, the standpipe, and especially the upper end thereof is heated sufficiently to vaporize the oil. It will be evident, therefore, that the standpipe 18 serves not only as a reservoir for oil, it being illustrated as having sufficient volume for this purpose, but also serves as a vaporizing chamber. The arrangement of the parts is such as to prevent the development of temperatures which will crack the oil. It will be seen further that the hotter the flame along the zone 14, the more oil will be vaporized. A high rate of volatilization, however, tends to lower the oil level and this, in turn, lessens the surface of oil exposed to heat and so tends to lessen the rate of vaporization. The reflecting and deflecting surfaces and the conducting members therefore are so arranged as to promote a regulated volatilization of the liquid fuel. In order that the possibility may be avoided of the development of pressure within the hollow of the body 10 due to the pores 14 becoming clogged and the vaporization of the liquid fuel within 18 continuing, the refractory disc 11, which is inserted into the upper section of the body 10 to serve as a closing cover for the hollow in it, may be perforated at its center by the aperture 61 which terminates at its upper end in a dished-out spherical surface 62, a hemispherical refractory body 63 being laid on the surface 62 so as to cover and sufficiently seal the hollow 61 against low pressures. In the event of anything above a normal pressure developing in the hollow of the body 10, the hemispherical refractory body 63 will be tipped to one side and permit the escape of the volatilized fluid. The standpipe 18 serves further as a settling chamber into the bottom of which foreign matter in the oil settles and may be removed through the normally closed aperture 36. The bottom of the standpipe 18 is enlarged as illustrated at 38 not only to provide a broader base for supporting itself and the burner body 10, but also to provide additional settling space. The settling space in standpipe 18 is made sufficient to hold such amount of sediment and non-volatilizable matter as is carried by the oil for the estimated time over which it is desired to utilize the burner without alteration.

In a normal operation of the oil burner, the oil is supplied through pipe 30 at such a rate that it is vaporized in the upper end of the standpipe 18 fast enough to maintain the fuel level in the standpipe or chamber 18 somewhat below the upper end of the overflow pipe 32 and also slightly below the upper end of the throat 16. During the preferred operation therefore the oil level is such that no liquid enters the chamber 12. In case the oil should be supplied too rapidly, however, or in case the flame should be extinguished or when starting the burner, some oil may enter chamber 12 and pass through the porous wall 14. Oil which has passed through wall 14 will burn as does the oil vapor and with the same effectiveness, but should this oil flow become excessive some of it may run down the outer surface of the wall and the standpipe 18. In case such drip oil should become ignited, it would become a source of serious danger. In order to catch the overflow of drip oil, a drip pan 40 is fastened to the standpipe 18 below the lower end of the surface 34, the pan 40 entirely surrounding the standpipe. Moreover, the pan 40 extends outwardly beyond the lower edge of the surface 34 so that any oil which may drop downward from the outer surface of the porous wall 14 will drop either directly into the pan 40 or will first strike the surface 34 and drip therefrom into the pin. A return pipe 42 leads out of the bottom of pan 40 and conducts oil from the pan 40 to the oil cut-off in the pipe 30, previously mentioned. There is of course considerable possibility that the drip oil in pan 40 may become ignited. In this case, the flame might easily travel back to the cut-off mechanism and along the supply line or otherwise spread. To avoid the danger just mentioned, the mouth of the pan 40 is covered by a wire screen or gauze 44 of sufficiently fine mesh to prevent flame from passing through it. The pan 40 and gauze 44 can therefore serve not only in an emergency, but also for heating the upper end of the standpipe 18 when putting the burner into operation. When starting the burner if the oil is turned on when the burner is cold, some of the oil will run down onto the gauze 44 and can be purposely ignited for heating the standpipe to the vaporizing temperature.

The oil burner previously described is not only efficient for burning oil, but it also is well designed to cooperate with a gas burner. In the arrangement illustrated a mixture of gas and air is introduced into the apparatus through pipe 45. Pipe 45 connects into a hollow ring 46 from which gaseous fuel is taken by small pipes 48, 48. The pipes 48 lead upwardly and their upper ends extend into the lower ends of vertical apertures 50, 50 in a frusto-conical member 52 which serves to support the reflecting member 34, previously mentioned. Secondary air enters the lower ends of apertures 50 around the ends of pipes 48 and mixes with the air-gas mixture from pipes 48 in the apertures or passages 50. When the gas burner is in operation, the mixture of air and gas burns at the upper ends of apertures 50 above the reflecting surface 34 in a draft passage 58 intermediate the surfaces 34 and 14. The surface 34 extends beneath the inclined surface of the oil burner member 10 so that the gas flames from the apertures 50 are adapted to burn away any carbon deposits which may form on the porous wall 14.

Air for burning the fuel which passes through the wall 14 and for supplying additional secondary air to the gas flames passes up around the standpipe 18 through an annular passage 56, the members 34 and 52 being spaced from the standpipe 18 for this purpose. The upwardly flaring surface of the member 34 moreover is spaced from the upwardly and outwardly flaring wall 14 of member 10 so that the products of combustion pass up through the air or draft passage 58 between the members 10 and 34. The flames from tips 54, being supplied with both primary and secondary air are well adapted to burn carbon deposits off of surface 14. The hot products of combustion may be used for heating various types of apparatus, but it is anticipated that the burner according to the present invention will be used principally for household heating purposes.

Figure 2:
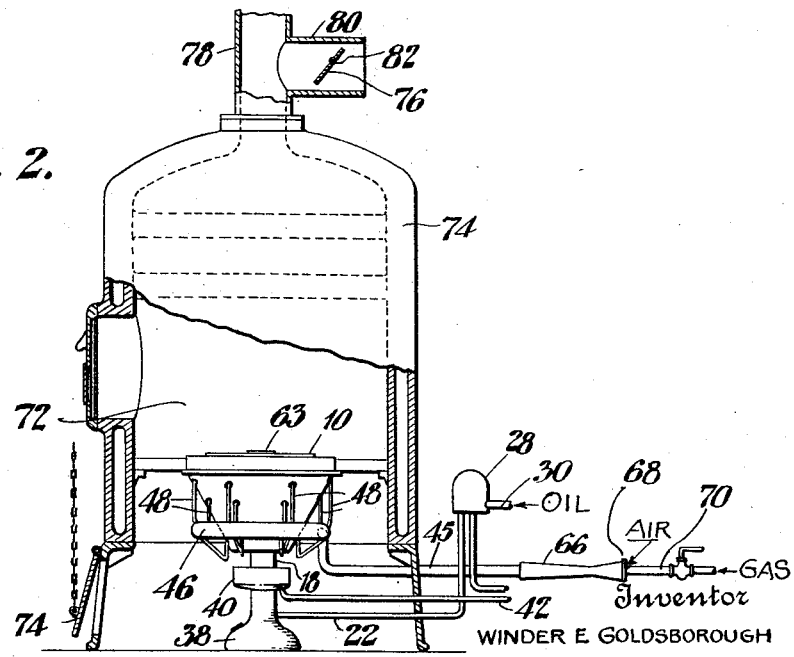
Fig. 2 is an elevation, parts being broken away and parts being shown in section, of a house heating apparatus equipped with a burner apparatus in accordance with the present invention.

Referring more particularly to Fig. 2, the mixture of gas and primary air in annular pipe 46 is delivered to pipe 45 from a mixer 66 of known type. Gas enters the open mouth 68 of mixer 66 from gas pipe 70, the gas being under enough pressure to enter mouth 68 as a jet and to draw primary air into the mixer 66 around the end of pipe 70 by an aspirating action.

In the arrangement illustrated in Fig. 2, the burner above described is placed within the furnace 72 of a house heating boiler 74. Furnace 72 is provided with the ordinary hand controlled damper below the burner. The arrangement illustrated also has an automatic check draft damper 76. It is well known that many oil burners for domestic heating purposes cause an objectionable roaring. It has been found that the roaring noise from a gas or oil burner is caused by an excessive draft. It has been found also that the draft in a given furnace increases after the burner has been lighted. This increase in draft is due to the heating up of the furnace and chimney. Therefore if the dampers are set to pass the amount of air needed for most efficient combustion when the burner is first lighted, the draft is too strong when the furnace and flue have heated up and roaring ensues. In the arrangement illustrated, the automatic damper 76, mentioned above, is adapted to limit the strength of the draft to prevent roaring. Damper 76 is placed so as to control an aperture opening into the flue 78 leading to the ordinary chimney. It is convenient, although not essential, to place the automatic check damper 76 in a short branch flue 80 opening into the main draft flue 78. The damper 76 is shaped to close the opening in flue 80 when the damper hangs vertically or nearly so. Damper 78 is pivoted at 82 about an axis somewhat above its center of gravity and is free to turn on the axis. When draft in furnace chamber 72 is low the weight of damper 76 causes it to hang down and close the opening through side flue 80 into the main flue 78. When, however, the draft in chamber 72 increases to the point that there would be danger of roaring by the flame of burner 10, the pressure on the lower part of damper 76 causes it to swing inward to admit air to flue 78 and limit the draft to a point below which roaring occurs. No limit can be fixed at which the draft will cause a given burner to roar, but a given damper can be counter-balanced after installation to adjust it to prevent roaring of the burner with which it is installed.

It will be understood that the overflow chamber 28 and overflow pipe 32 can act as a means in addition to the aperture 61 and body 63 to relieve abnormal pressure within hollow head 10. If the pressure in head 10 reaches a given point, the oil will be forced out of standpipe 18 until the end of pipe 22 is uncovered, permitting a quick relief of the pressure in head 10 and standpipe 18.

While I have illustrated and described a particular form of apparatus according to the present invention I do not limit myself to any detail of construction or arrangement, whether described and illustrated herein or not, except insofar as such detail may be barred as not clearly included in one or more of the appended claims.

Having thus described my invention, I claim:

1. An oil burning apparatus including a refractory head having a porous portion, a metallic support for said head through which fuel is introduced thereinto and means to heat fuel in said support from fuel burning on the surface of said porous portion to vaporize fuel passing through the support.

2. An oil burning apparatus including a head having a porous portion, means for conducting liquid fuel toward said head and a gas burner arranged to direct a gas flame toward said porous portion.

3. A burner apparatus including a hollow refractory head having upwardly and outwardly flaring sides, the wall of said flaring portion being porous, a reflecting surface surrounding said flaring portion but spaced therefrom to provide an air passage, a metal standpipe supporting said head, the upper end of said standpipe being exposed to said reflecting surface to receive heat therefrom, and gas burners arranged to project flames upwardly into said air space.

4. An oil burning apparatus including a refractory head having a porous portion, a support for said head through which fuel is introduced thereinto, and means to conduct and reflect heat from fuel burning on the surface of said porous portion to and against the said support to vaporize fuel passing therethrough.

5. A burner apparatus including a hollow refractory head having upwardly and outwardly flaring sides, the wall of said flaring portion being porous, means to cause combustion to occur at said porous portion, means to vaporize fuel by said combustion, means to cause the vapors of said fuel to permeate said porous portion, and means to maintain said fuel at a constant level with reference to said porous portion.

6. A burner apparatus comprising a hollow body having a closed top and a vertical section of upwardly and outwardly flaring form, the upwardly inclined portion of said body being porous, means to supply fuel to the interior of said body and a gas burner arranged in spaced relation to said body to discharge hot gases against said porous portion.

7. An oil burning apparatus including a refractory burner head, a metallic standpipe supporting said head, a receptacle supported by said standpipe and a heat reflecting surface surrounding said refractory head arranged to guide oil flowing from said head into said receptacle.

In testimony whereof I affix my signature.

WINDER E. GOLDSBOROUGH.